(12) United States Patent
Jivakov et al.

(10) Patent No.: US 7,257,775 B1
(45) Date of Patent: Aug. 14, 2007

(54) PROVIDING USER INTERFACE ELEMENTS IN AN APPLICATION THAT CHANGE IN RESPONSE TO CONTENT

(75) Inventors: Todor I. Jivakov, Redmond, WA (US); Jonathan Parati, Woodinville, WA (US); Abdulwajid Mohamed, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 10/405,003

(22) Filed: Mar. 31, 2003

(51) Int. Cl.
*G06F 3/00* (2006.01)

(52) U.S. Cl. ..................................... 715/742
(58) Field of Classification Search .................. 715/742
See application file for complete search history.

(56) References Cited

U.S. PATENT DOCUMENTS

| | | | |
|---|---|---|---|
| 5,818,446 A | 10/1998 | Bertram et al. | ............. 345/334 |
| 6,091,411 A * | 7/2000 | Straub et al. | ............... 715/747 |
| 2004/0098451 A1* | 5/2004 | Mayo | ......................... 709/203 |

OTHER PUBLICATIONS http://www-128.ibm.com/developerworks/ibm/library/i-portletintro/#resources (Feb. 1, 2003, pp. 1-10).*
Screen Dumps of Internet Explorer (2001, pp. 1-5).*
Screen Dumps of Microsoft Windows Operating System (2001, pp. 1-3).*

* cited by examiner

*Primary Examiner*—Kristine Kincaid
*Assistant Examiner*—Le Nguyen

(57) ABSTRACT

A user interface is automatically updated when the content sources that provide information or data accessible within an application are added or deleted. Associated with each category of content source is a content processor. The content processor determine the appropriate control elements that should be included in a user interface to access the content provided by the content sources associated with the content processor. The hierarchy and layout of the control elements in the user interface are suggested by the control processors as a function of the content sources that are available. Localization of a user interface in different versions of an application can readily be implemented simply by providing the appropriate content processors that define the user interface for each version of the application.

30 Claims, 9 Drawing Sheets

PROVIDING USER INTERFACE ELEMENTS IN AN APPLICATION THAT CHANGE IN RESPONSE TO CONTENT

FIELD OF THE INVENTION

The present invention generally pertains to a user interface for accessing content through an application, wherein changes in the content alter the user interface, and more specifically, pertains to dynamically changing controls that are displayed to a user in a user interface when running an application, in response to changes in the content accessible through the application.

BACKGROUND OF THE INVENTION

Applications that are employed to enable users to access information typically employ a user interface that is specifically designed to enable a user to selectively display data about a subject from among different categories of information. Since an application typically defines the specific appearance of each user interface, the content that can be accessed using control buttons, menus, and other interface elements in each user interface of the application will normally be statically defined when the application is released for distribution. The constraints imposed by a user interface that is statically defined will thus preclude making changes in the information content that can be selected with controls in the user interface after the application is distributed. For example, if at the time an application was released for distribution, it included a user interface that enabled users to select from among five different sources of information, it would typically be necessary to rewrite the code that defines the user interface to enable users to access additional sources of information that later become available. Typically, an update of the application would have to be written and released for installation by users. Specifically, the user interface would need to be changed to include control buttons or other control elements for selectively accessing the additional information sources. Furthermore, each time that additional information sources are added, yet another update of the application with a rewritten and revised user interface must be manually written and released for installation by the user of the application. Clearly, for applications in which the content or information that is accessed by selections made in a user interface changes frequently, the need to continually modify the user interface to enable selection of the changing content creates a substantial problem, because the cost of updating the applications with each new user interface represents a significant overhead.

A related problem exists in applications that are "localized" for release in different languages and cultures. The customization of different versions of a software application to provide appropriate user interfaces for each different language and/or culture is referred to as "localization." The localization of the user interfaces in an application will typically require that each control button or other control elements within the user interfaces of the application be provided in the language of the region in which that version of the application will be released. Also, different user interfaces are necessary to satisfy the cultures preferences for each different localization region. Even though users in two different geographic regions nominally speak the same language, there are often differences in spelling of words that might appear in a user interface. In addition, differences in the cultures may require changes be made in the user interfaces of an application distributed to different regions. For example, differences in the culture, interests, geography, and the history of the people in Mexico compared to those in Spain or other Spanish speaking countries may require that an dictionary application distributed in Mexico include different content than the same application distributed in Spain. Thus, the user interfaces provided in the dictionary application sold in each region must normally be custom designed and written specifically for each region in which the dictionary application will be sold. The cost and problems involved in providing localized content and in supporting different user interfaces needed to access the localized content for all of the major geographical/cultural regions of the world are very significant. The time required for such localization tends to delay the release of new applications.

Accordingly, it would be extremely beneficial to develop an approach that enables user interfaces in an application to be dynamically modified in response to the specific information that is accessible through the user interfaces. Further, it would be desirable to enable a user interface to automatically adapt to changes in content included in an application, so that localization of the application to different regions can be done without writing specific user interfaces for each different region. Currently, user interfaces in an application do not react dynamically to changes in information content accessed within the application. By enabling the content to include instructions needed to dynamically alter the features and control elements included within a user interface so that users can access the content within the application, the need for manually rewriting the user interface will be eliminated, thereby providing a substantial improvement in efficiency and a reduction in the costs incurred to create and maintain such applications.

SUMMARY OF THE INVENTION

The present invention will initially be used in Microsoft Corporation's Encarta™ dictionary tools to dynamically modify a user interface by changing the control buttons, menus, or other control elements as "books" or content data accessible by a user from within the program change. However, it is not intended that the invention in any way be limited to this type of software program. More broadly, the present invention is directed to a method for dynamically modifying a user interface of almost any application, in response to changes in content that are accessible through the user interface. When an application is executed, sources of content that are to be accessible through the user interface are enumerated. Sources of content can be almost any type of data files that are stored in a location accessible by the application, either locally or remotely. Each source of content that is enumerated includes specific data providing the instructions that can be executed to modify the user interface as necessary to include any control element needed to access the source of content. A control element hierarchy for the control elements is determined within the user interface. For example, selection of one control button may cause additional control buttons to be displayed in a sub-menu. The control elements are displayed within the user interface in accord with the control element hierarchy, which defines the structure and layout of the control elements and their parent/child relationships.

The step of modifying the user interface includes enumerating the control elements that are required in the user interface for accessing the content of each source of content that is enumerated. The step of building the control element hierarchy comprises the steps of determining an order in which the control elements are displayed within the user interface, as well as determining any sub-level control elements that will be displayed when a higher level element is selected by a user in the user interface, i.e., displaying sub-menus of control elements when a parent control element is selected.

A content processor implements the changes in the user interface in response to the changes in content. A different content processor is provided for each different category of content. The content processors are preferably stored in a specific location, so that when enumerating the content processors, each content processor can be readily found. Each content processor is included in at least one file, and a specific file extension is preferably used for the files, so that the content processors can be more readily identified based upon the specific file extension used in the file names for the content processors. The method further provides for confirming that each file that has the specific file extension is indeed a true content processor for the application.

A content processor serves as an interface between the sources of content and the application, and a different content processor is provided for each different category of content. Thus, the content processor for a specific category of content determines the control elements needed to access each source of content enumerated within that category.

The present invention is also useful for localizing a user interface for different versions of an application. Since each version will include different content sources, the user interface that is displayed for a specific version is automatically provided with control elements corresponding to the content sources for that version. In a broader context, the present invention dynamically changes a user interface in response to changes in the content that is accessed through the user interface.

A further aspect of the present invention is directed to a memory medium that stores machine instruction for carrying out the steps of the method discussed above. Yet another aspect of the present invention is directed to a system that includes a memory in which a plurality of machine instructions are stored, including machine instructions for the application, a display on which text and graphics are displayed to a user, and a processor coupled to the memory and to the display. The processor executes the machine instructions to carry out a plurality of functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 8:
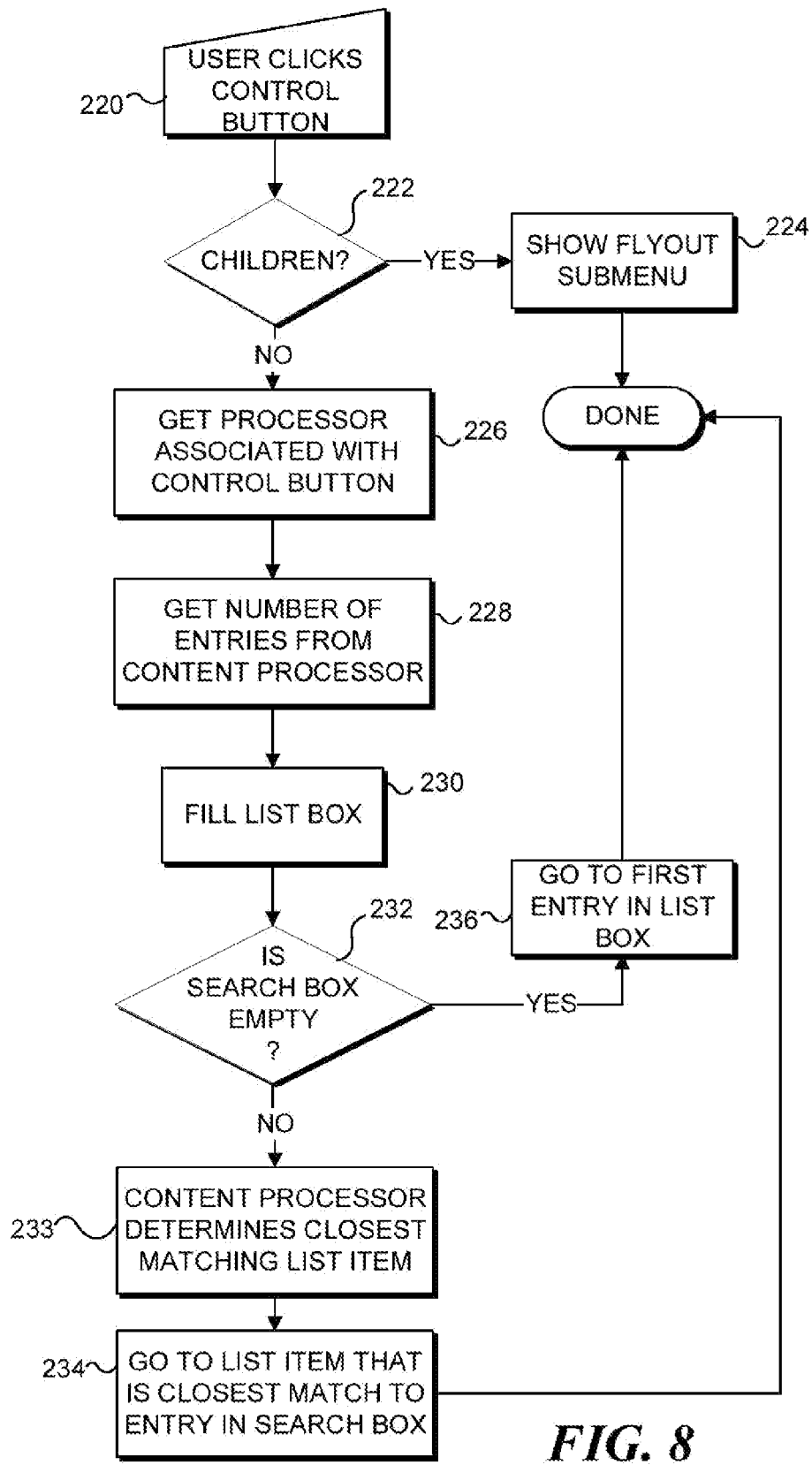
Figure 9:
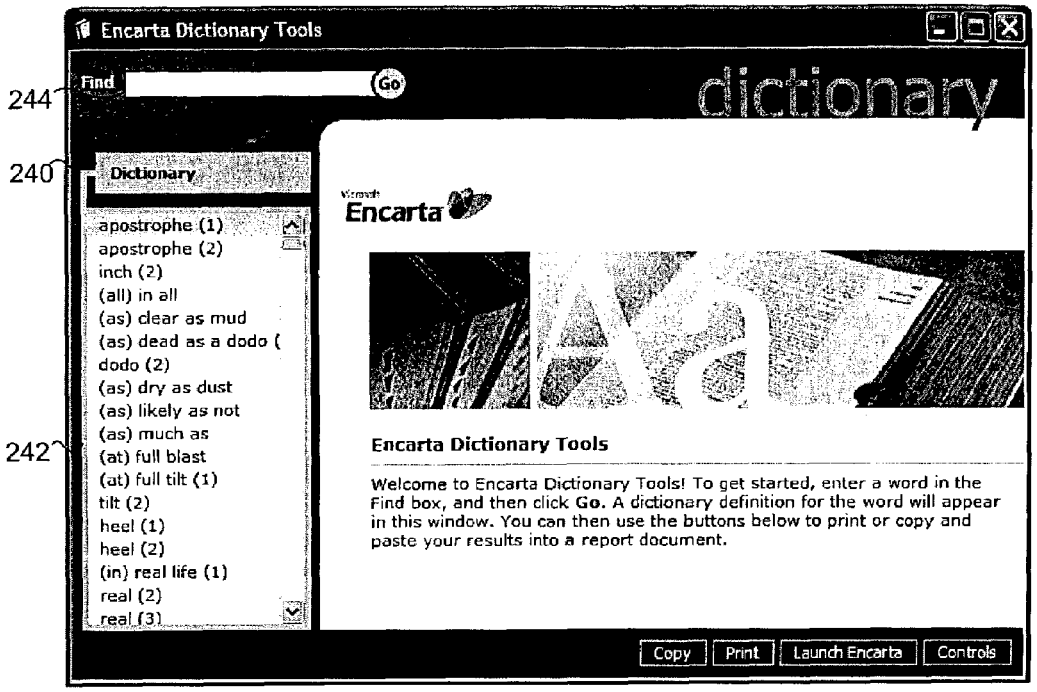
Figure 10:
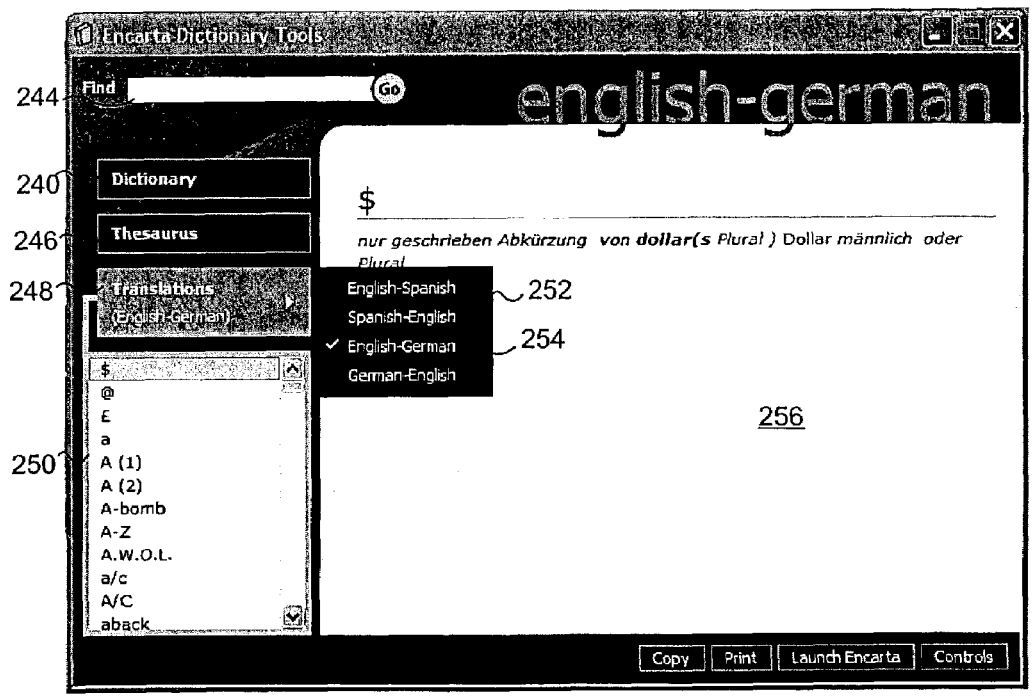

FIG. 8 is a flow chart showing the logical steps implemented when a user clicks on a control button added into the user interface; and FIGS. 9 and 10 are copies of exemplary displays of a dynamically changed user interface that respectively show the control elements displayed when only a dictionary is accessible through an application, and when a thesaurus and translations are added as content sources.

DESCRIPTION OF THE PREFERRED EMBODIMENT

Exemplary Operating Environment

Figure 1:
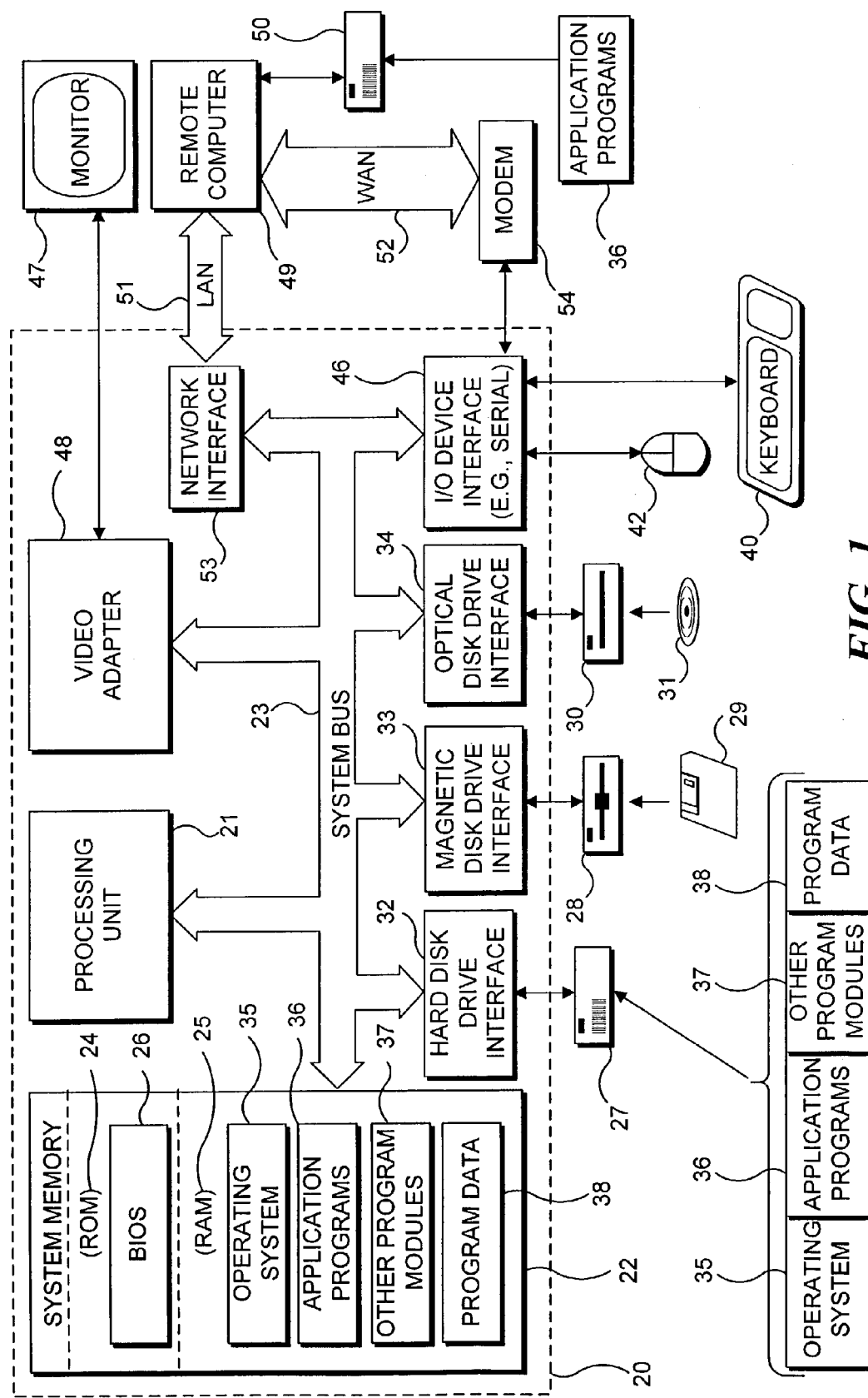
FIG. 1 is a functional block diagram of a generally conventional personal computer that is suitable for executing the present invention.

FIG. 1 and the following discussion are intended to provide a brief, general description of a suitable computing environment in which the present invention may be implemented. Although not required, the present invention will be described in the general context of computer executable instructions, such as program modules that are executed by a personal computer. Generally, program modules include routines, programs, objects, components, data structures, etc. that perform particular tasks or implement particular abstract data types. Moreover, those skilled in the art will appreciate that this invention may be practiced with other computer system configurations, including hand held devices, pocket personal computing devices, digital cell phones adapted to connect to a network and other microprocessor based, or programmable consumer electronic devices, multiprocessor systems, network personal computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional personal computer (PC) 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a CDROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer readable media provide nonvolatile storage of computer readable machine instructions, data structures, program modules and other data for PC 20. Although the exemplary environment described herein employs a hard disk, removable magnetic disk 29, and removable optical disk 31, it will be appreciated by those skilled in the art that other types of computer readable media, which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36 (such as a program that employs the present invention), other program modules 37, and program data 38. A user may enter commands and information into PC 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display data from content sources accessible through an application, and/or other information. In addition to the monitor, PCs are often coupled to other peripheral output devices (not shown), such as speakers (through a sound card or other audio interface—not shown), and printers.

PC 20 may operate in a networked environment using logical connections to one or more remote computers, such as a remote computer 49. Remote computer 49 may be another PC, a server (which is typically generally configured much like PC 20), a router, a network PC, a peer device, satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets and the Internet.

When used in a LAN networking environment, PC 20 is connected to LAN 51 through a network interface or adapter 53. When used in a WAN networking environment, PC 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Use of the Present Invention

The present invention is most useful in an application that can access different kinds of data through a user interface, and is particularly useful in dynamically modifying the user interface to provide appropriate control elements for accessing information provided in the data as the content accessible within the application changes. Most often, changes occur when additional content is made available for access within an application; however, the present invention can also readily modify the user interface to eliminate control elements that are no longer needed to access content that has been removed and is no longer accessible.

The content that can be accessed through an application can be stored in different locations, so long as the application is made aware of where to look for the content when the application is initially executed. Such content can be located on the same computing device or PC on which the application is being executed, or alternatively, can be located on another computing device or on a server accessed over a LAN or over a WAN, including the Internet. The variety of types of data that can be accessed in connection with the present invention is virtually limitless. Furthermore, the kinds of applications in which the present invention can be employed for dynamically modifying a user interface so that the control elements in the user interface provide access to the content is also virtually limitless.

Figure 2:
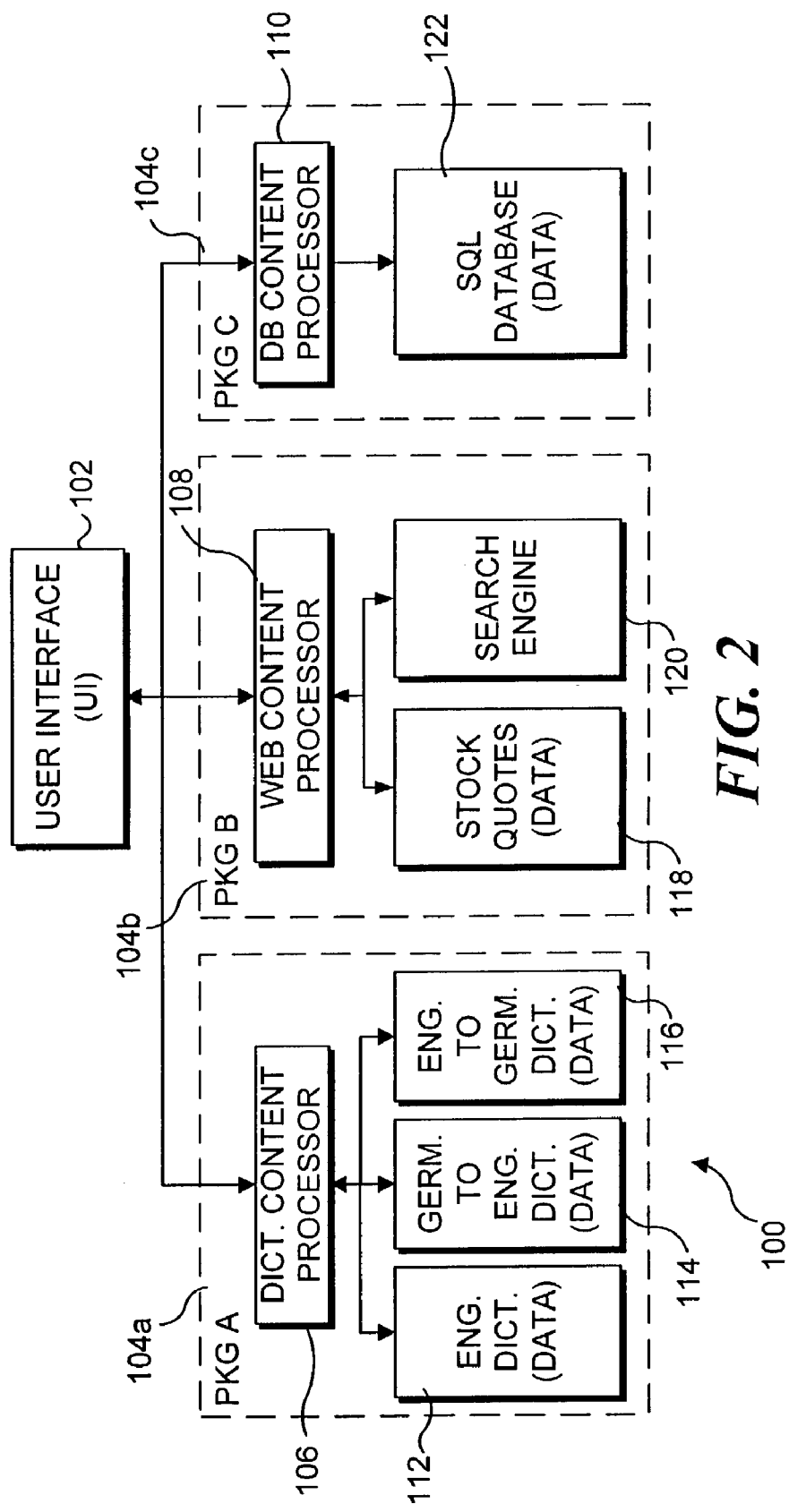
FIG. 2 is a schematic block diagram illustrating an example in which three different types of content sources each interact with a user interface in an application.

As noted above, an initial use of the present invention will be in a dictionary program to accommodate changes in "books" and other content sources that the user can access with the program. A schematic block diagram 100 in FIG. 2 illustrates the relationship between a user interface 102 and packages A, B, and C (respectively identified by reference numbers 104a, 104b, and 104c). Each package corresponds to a different category of content that is accessible to the program through user interface 102. Each different category of content has a corresponding content processor, i.e., a dictionary content processor 106 in package A, a Web content processor 108 in package B, and a database (DB) content processor 110 in package C. Each of these different content processors modifies the user interface to include specific control elements corresponding to the content sources served by and associated with that the content processor. Only the content sources within a specific category are serviced by and associated with the content processor for that category.

For example, dictionary content processor 106 accesses interface data for three different types of dictionaries, including an English dictionary 112, a German to English dictionary 114, and an English to German dictionary 116. German to English dictionary 114, and English to German dictionary 116 can be thought of as translation dictionaries and therefore may be referenced under a different subcategory than English dictionary 112. Dictionary processor 106 suggests the layout for the control elements such as control buttons and menus to be dynamically included in user interface 102, based upon the instructions provided in the source data files for the three dictionaries shown in this example.

In package B, Web content processor 108 suggests the control elements and hierarchy of the control elements that should be included in user interface 102, based upon interface information included within the data of a stock quotes content 118 and a search engine content 120. It will be apparent that these are simply two examples of Web content that might be accessible through an application and that many other types of content could be included and serviced by Web content processor 108. User interface 102 determines the final layout based on the proposed button/menu ordering suggested by the various content processors.

Finally, in package C, DB content processor 110 accesses user interface information included in a structured query language (SQL) database 122, to determine how to modify user interface 102. The SQL database can include a variety of different control elements for accessing different reports or tables within the database. These control elements are predefined within the control information for this content, as a function of the specific components of the SQL database that are selectively accessed by the control elements.

Figure 3:
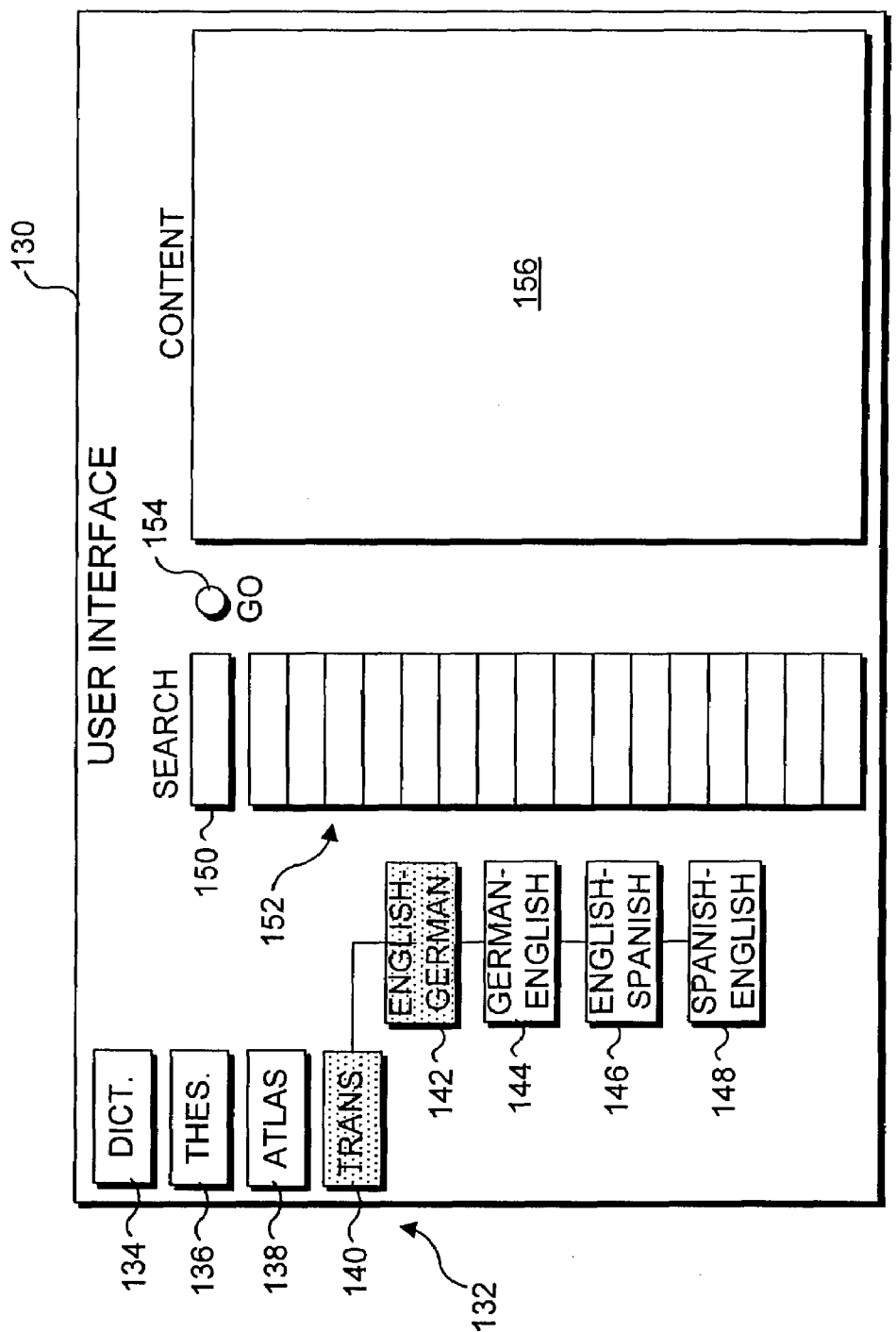
FIG. 3 is an exemplary user interface for an dictionary in which the present invention is employed.

FIG. 3 illustrates an exemplary user interface 130 having a plurality of control elements for enabling the user to selectively access several different types of information. In this example, a control button 134 is provided to enable the user to select an English dictionary. Similarly, control buttons 136 and 138 respectively enable access of a thesaurus and a world atlas. When selected, each of these control buttons (which are collectively identified by a reference numeral 132), can display a sub-menu of additional control buttons. In the example shown, a control button 140, which has been selected by a user, provides access to a plurality of different language translation dictionaries. In this example, the selection of control button 140 has caused the display of additional control buttons, including an English to German translation control button 142, a German to English translation control button 144, an English to Spanish, translation control button 146, and a Spanish to English translation control button 148. The dotted background on the English to German translation control button 142 indicates that it is currently selected. Accordingly, the user can enter an English search term in a search box 150 to determine a corresponding German term. Initially, a list 152 displays the different terms in the English to German dictionary, starting with the first. However, once the user enters an English word in search box 150, list 152 will scroll to the terms that most closely match the search term, with the closest match at the top. If a user selects one of these terms, or if the user presses the Go button, a content section 156 will display the translation of the selected English term, by showing its corresponding German equivalents.

As more clearly explained below in regard to the examples of FIGS. 9 and 10, each time that a user adds or deletes content from a defined location where content sources are stored, control buttons 132 will be modified accordingly. For example, in connection with FIG. 3, if the user were to delete the English to Spanish and Spanish to English translation content sources, English to Spanish translation control button 146 and Spanish to English translation control button 148 would no longer be displayed in user interface 130. Similarly, if the user were to add a legal dictionary and a medical dictionary, corresponding control buttons to access each of these new dictionaries would be added in a sub-menu under dictionary control button 134 so that when it is depressed, the English dictionary, the medical dictionary, and the legal dictionary would then be displayed. Such changes and many others are readily accomplished by the present invention, since the information needed to determine the hierarchical level, parameters, and structures of each of the control elements within a user interface is included within the content sources.

Logical Steps for Implementing the Present Invention

Figure 4:
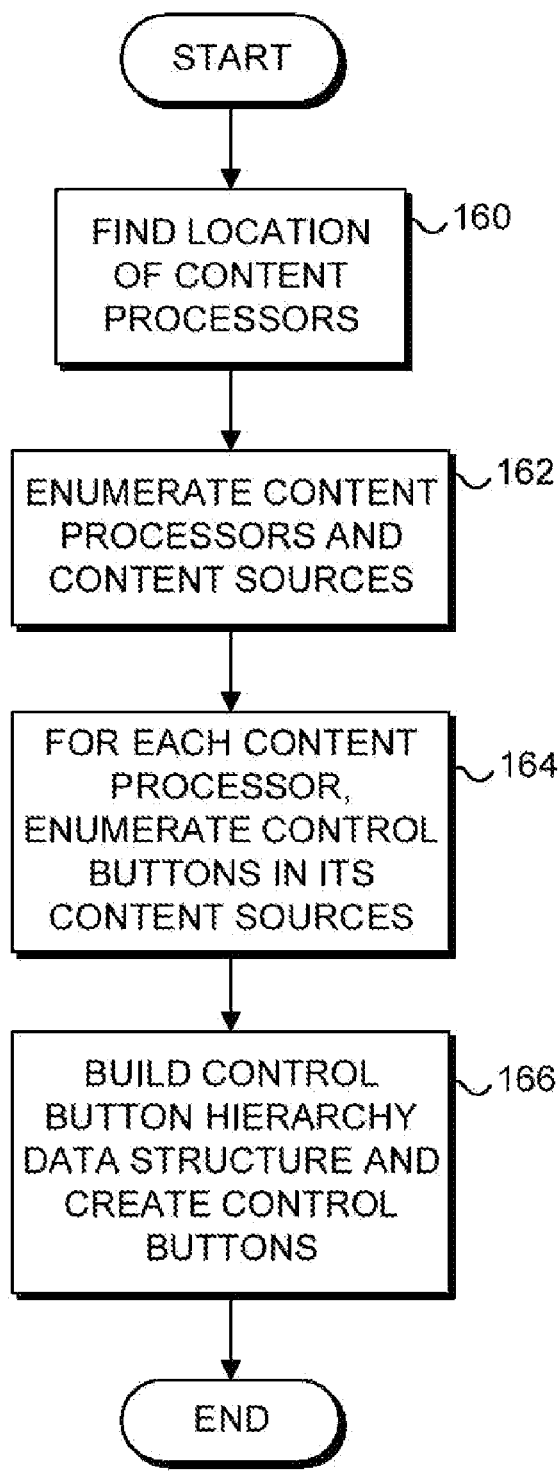
FIG. 4 is a flow chart showing the steps carried out in a preferred embodiment of the present invention.

The logical steps employed for implementing the present invention in a preferred embodiment are illustrated in FIG. 4. These logical steps typically start when an application in which the present invention is employed is initially executed by the processor of a computing device. In a step 160, the location of the content processors (which is the location of the content sources) is determined. Typically, this location will be predefined and recorded in the operating system registry for the application. However, it is also contemplated that a user of the application may be given the option for selecting one or more locations on a local hard drive, on another computer, on a server storage, or even at some remote location accessed over a WAN (e.g., over the Internet). In any case, the content processors that are at the location that is indicated are enumerated in a step 162. As noted above, each category of content sources must include a single content processor. The content processor provides the machine instructions for that content category, usually based on data inside the content sources.

In a step 164, for each content processor that is enumerated, the logic then enumerates one or more control buttons or other control elements that are required to enable a user of the application to access the content sources associated with the content processor from within the user interface, as noted above. As used herein, the term "control button(s)" is intended to encompass any type of user interface control element that can be selected to access data provided in a content source. A step 166 builds the control button hierarchy data structure and creates the control buttons within the interface so that they will be displayed when the user interface is displayed from within the application. The control button hierarchy determines the ordering and layout of the control buttons or other control elements within the user interface and also determines the parent/child relationship between control elements and the sub-levels of the control elements, so that when one control button or control element is selected, a corresponding sub-menu is displayed, enabling the user to select from among the sub-menu. Further, additional lower levels of sub-menus can then be displayed as appropriate, when one of the sub-menus is selected by the user. The hierarchical relationship of such control element options are well known to those of ordinary skill in the art.

Figure 5:
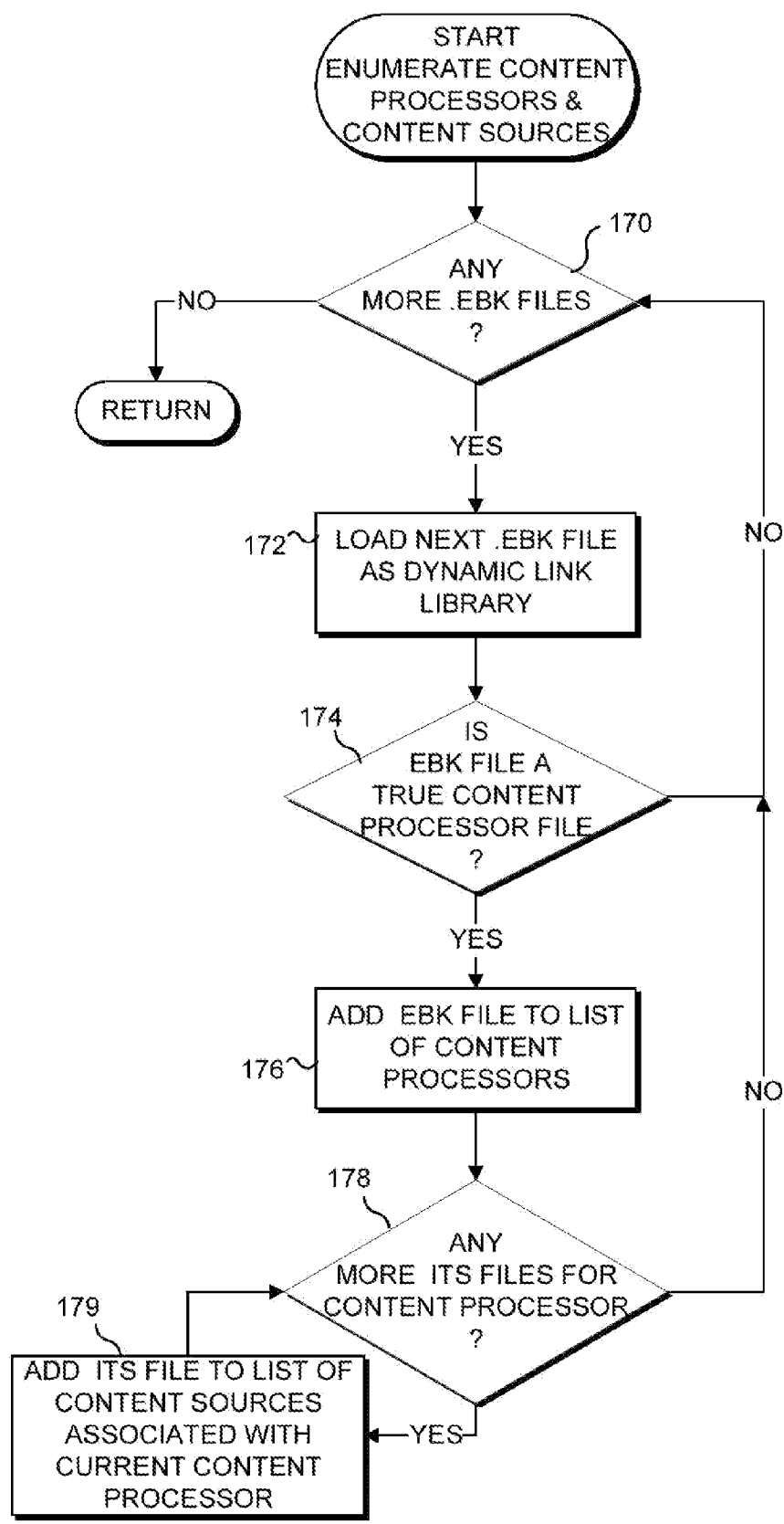
FIG. 5 is a flow chart illustrating the logical steps for enumerating content processors.

As shown in FIG. 5, details of the step for enumerating the content processors begins with a decision step 170, which determines if there are any more .EBK files. In this embodiment, each content processor is associated with a specific file extension (.EBK) so that in the location for the content processors, each content processor can readily be identified based upon the file extension associated with it. It will be understood that other file extensions or other mechanisms for identifying content processors can alternatively be employed. Accordingly, decision step 170 determines if all such content processors have been processed. If there are no further content processors, the logic returns to the steps illustrated in FIG. 4. However, if any such content processors remain to be processed, a step 172 loads the next .EBK file or content processor as a dynamic link library (DLL). Again, this is simply a preferred manner of practicing the present invention, since other types of modules could alternatively be employed to define a content processor for a particular category of content sources. A decision step 174 checks to determine if the current .EBK file is a true content processor file. In this embodiment, a content process is a DLL file that has been renamed to have a .EBK file extension. Step 174 is carried out to ensure that some other file that is not a content processor file has not been named with a .EBK file extension and inadvertently stored in the location normally reserved for content processor files and content sources. If the current file is not a content processor file, the logic loops back to decision step 170. However, if the logic determines that the current .EBK file is indeed a content processor file, the logic continues to a step 176, which adds the .EBK file to a list of content processors that will be used in connection with the application being executed to enable dynamic modification of the user interface so that the content sources associated with each of the content processors can be accessed. In this embodiment of the present invention, the actual data or content that are accessed through the user interface are stored in compressed text database files, which have a ITS extension. However, it will be appreciated that the content sources can be almost any data source file(s) that the content processor can read and understand. Accordingly, a step 178 determines if there are any more content sources i.e., ITS files, associated with the current content processor, and if so, a step 179 adds the ITS file to the list of content sources associated with the current content processor (i.e., within its category). As noted above, each category of content processor is responsible for handling the changes to the user interface for changes in the content sources under that category. Once all content sources for the current content processor have thus been enumerated, the logic loops back to decision step 170.

Figure 6:
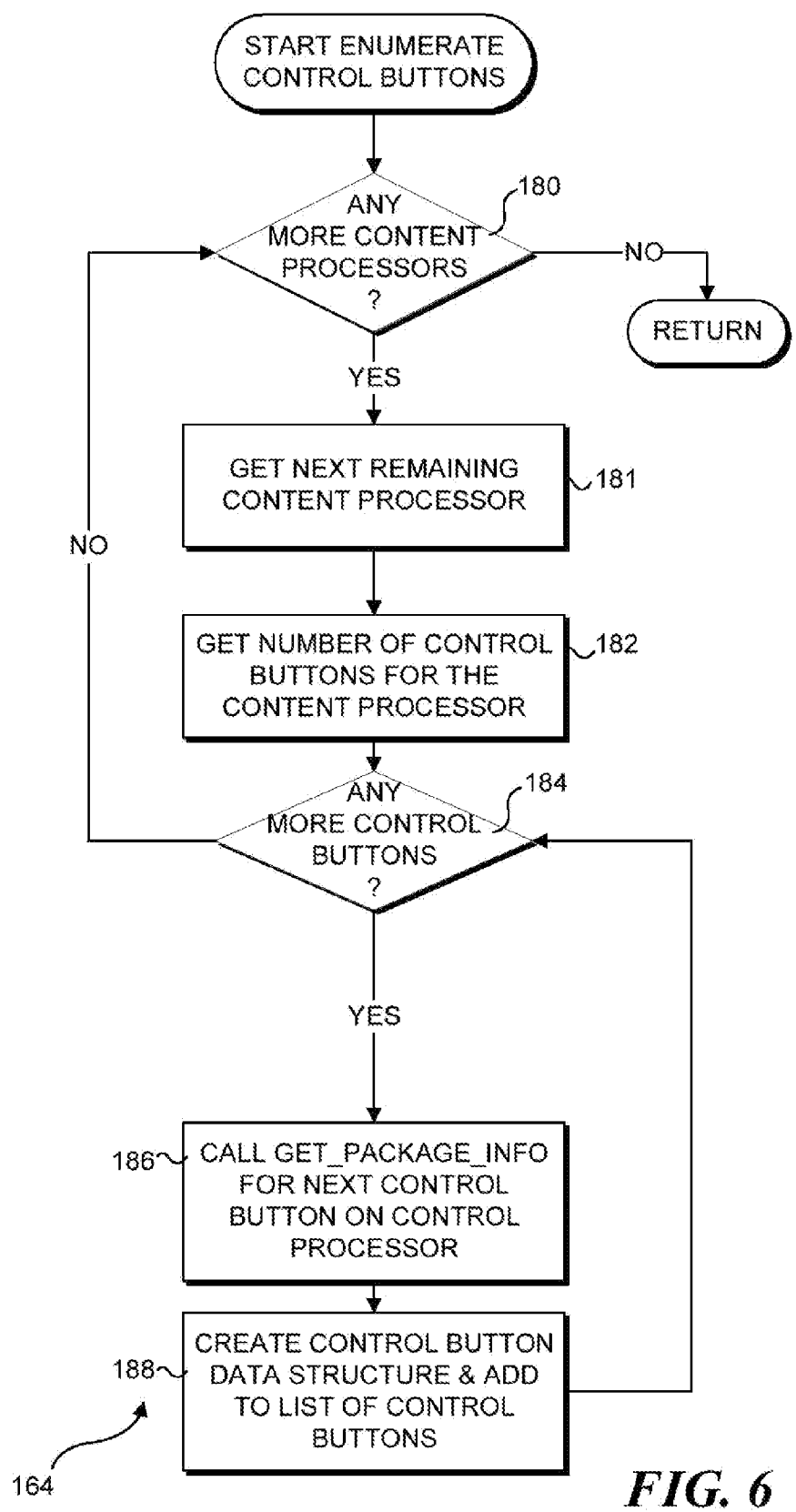
FIG. 6 is a flow chart illustrating the logical steps for enumerating control buttons.

As shown in FIG. 6, details for step 164 (FIG. 4) are illustrated in connection with enumerating the control buttons. A decision step 180 in FIG. 6 determines if any more content processors need to be processed, and if not, the logic returns to the steps shown in FIG. 4. However, if any content processor remains to be processed, a step 181 will select the next remaining content processor as the current processor, and a step 182 in FIG. 6 gets the number of control buttons that will be inserted into the user interface by the content processor that is currently being evaluated. A decision step 184 determines if any more control buttons remain to be processed for the current content processor. If not, the logic loops back to decision step 180. However, if control buttons remain to be processed, a step 186 calls the GET_PACKAGE_INFO for the next control button provided by the control processor. This information is provided within the content source that is specifying the current control buttons. The GET_PACKAGE_INFO module obtains the information for each successive control button from the content sources for which those control buttons will be used to access information provided by the content source. Next, a step 188 creates the control button data structure for each of the content sources associated with the current content processor and adds the control button data structure to the list of control buttons (or other control elements) within the user interface. The logic then loops back to decision step 184.

Figures 7A, 7B:
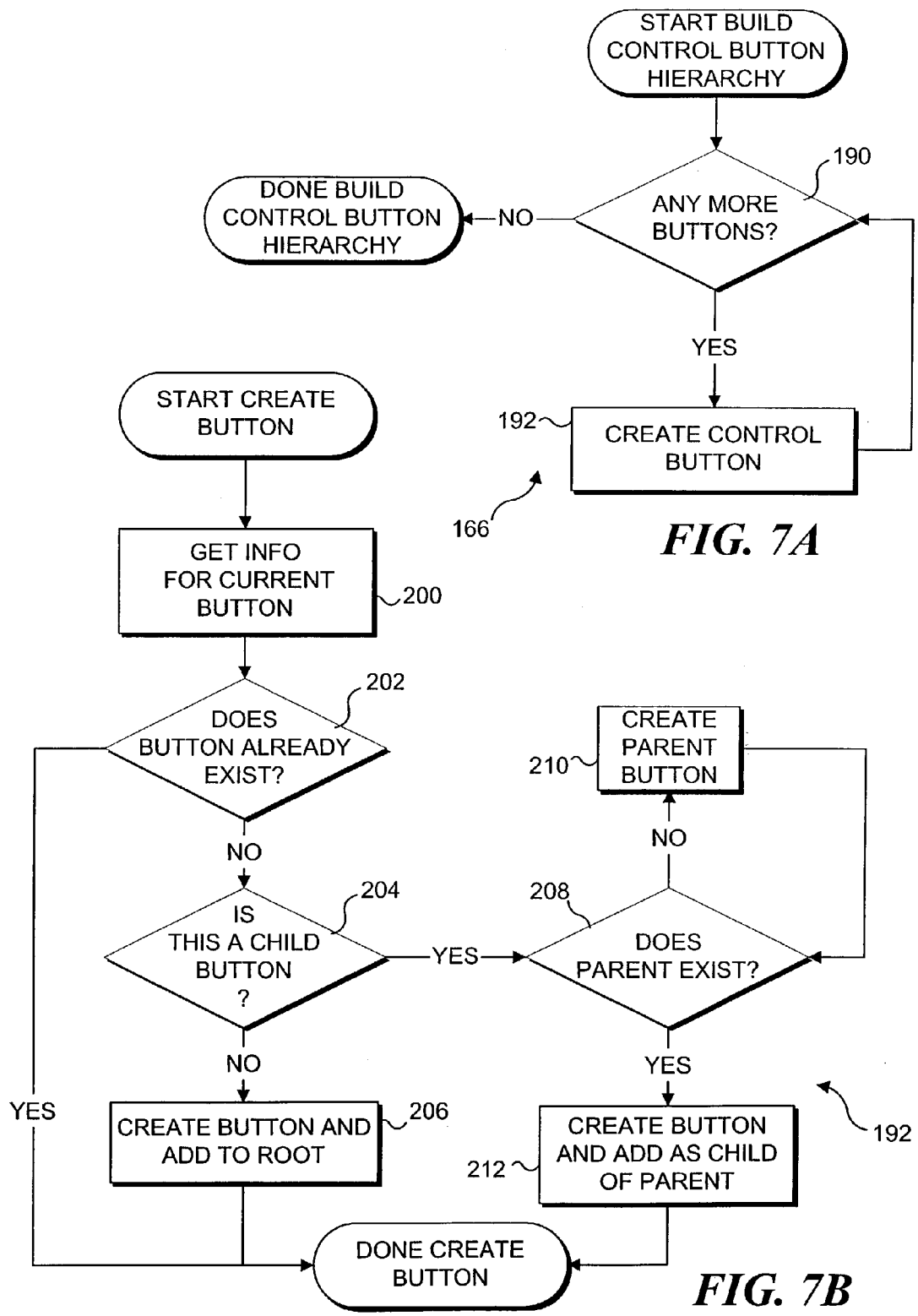
FIG. 7A is a flow chart illustrating the logical steps for building a control button hierarchy.
FIG. 7B is a flow chart illustrating the logical steps for creating control buttons in a user interface.

In FIG. 7A, details of step 166 for building the control button hierarchy are illustrated. A decision step 190 determines if any more buttons remain to be processed. If so, a step 192 creates a control button for the current content source. If no more control buttons remain, the process is complete. Once the current control button has been created, the logic loops back to decision step 190.

In FIG. 7B, details of step 192 for creating a control button are illustrated. A step 200 gets the information required to instantiate the current control button in the user interface from the content source that is being accessed in connection with the current content processor. A decision step 202 determines if the current control button already exists within the user interface, since a control button or other control element may have been previously instantiated by a different content source. If the response to decision step 202 indicates that the current control button already exists, the logic for the steps carried out in FIG. 7B is complete, since the control button has already been created. If not, the logic proceeds to a decision step 204, which determines if the current control button is a child. A negative response to decision step 204 creates the current control button and adds it to the root level of the control button hierarchy within the user interface, at a step 206. Thereafter, the logic in FIG. 7B is complete. However, if the response to decision step 204 indicates that the current control button is a child, the logic proceeds to a decision step 208. This decision step determines if a parent for the current control button exists. If not, a step 210 provides for creating the parent for the current control button. However, if a parent already exists, the logic proceeds to a step 212, which creates the current control button and adds it as a child of the parent identified in decision step 208. Following step 212, the logic of FIG. 7B is complete.

Once the user interface is displayed to enable access to the content sources, the logic implemented in response to a control button being selected is illustrated in FIG. 8. In a step 220, the user clicks on one of the control buttons displayed in the user interface. A decision step 222 then determines if the current control button has any children, which would be the case if the selected control button causes a sub-menu to appear in the user interface. If so, a step 224 displays a fly out sub-menu of control buttons or other control elements. The logic of this flow chart then repeats, at step 220, when a person selects one of the displayed control elements on the fly out sub-menu.

A negative response to decision step 222 leads to a step 226, which provides for getting the content processor associated with the control button. By activating the control button, the user is accessing content within the content source, and a step 228 determines the number of entries that will need to be displayed in response to the selection made by the user. These entries appear in the user interface in a list box. Next, a step 230 fills the list box with the entries derived from the content source data. For example, as shown in FIGS. 9 and 10, the list box may be filled with words or phrases. A decision step 232 determines if the search box is empty (assuming that a search box is appropriate for the option selected by the user). In some instances, a control button will not require a list box or be associated with a plurality of data records, or will not need to have a search box associated with it. However, FIG. 8 is exemplary of a common user interface logic that is implemented when a user actuates a control button. In this example, a search box is provided in response to the user selecting the control button.

If the determination in decision step 232 is that the search box is not empty, a step 233 requests that the content processor determine the closest match, and a step 234 goes to the list item in the list box closest to the entry that has been made in the search box. For example, if the list box is filled with entries from an English dictionary, and if the user has typed in a word from the English language, step 233 would find the closest match to the word within the list, and step 234 would display the closest match at the top of the list box. Following step 234, the logic is complete.

If in decision step 232, the search box is empty, a step 236 would go to the first (default) entry in the list box. It will be apparent that until a user types an entry in the search box, the list box will be filled with a list, which will typically start at some predefined entry point in the data. Following step 236, the logic is again complete.

An example showing how the present invention facilitates adding content sources is shown in FIGS. 9 and 10, in connection with Microsoft Corporation's Encarta™ product. The user interfaces shown in FIGS. 9 and 10 are specific to this exemplary application of the present invention and are not intended to be limiting to the scope of the invention. In FIG. 9, the Encarta application includes only an English dictionary content source. Accordingly, only a control button 240 is provided for accessing the dictionary content. A search box 244 is empty, and a list box 242 includes English words and phrases from the dictionary starting with the letter A. The user can scroll through the list of words and phrases, or alternatively, as indicated above can enter a term in search box 244 to access a specific word or phrase. In FIG. 10, the user interface has been dynamically modified in accord with the present invention, to automatically include a thesaurus control button 246, and a translation (a parent) control button 248 for accessing translations. Under translation control button 248 are provided a pair of control buttons 252 for selecting either English to Spanish translations or Spanish to English translations, and a pair of control buttons 254 for selecting either English to German or German to English translations. As shown in this example, the user has selected the English to German translation control button, resulting in a list of English words or phrases being displayed in a list 250. Since search box 244 is empty, the first item in the list, which is a "$," is selected and the corresponding content from the English to German translation data is shown in a content box 256, i.e., a German definition of this English symbol is displayed. If the user were to add additional content sources such as translations from English to French and French to English, the data in these two content sources would cause corresponding control buttons to be added to the sub-menu, between pairs of control buttons 252 and 254. Accordingly, it will be apparent that the present invention enables content sources to be changed and automatically accommodates such changes by making corresponding changes to the control elements in a user interface.

Another application of the present invention is in connection with localization of an application where different versions of the application must be provided for different cultures and languages. Differences between the content that is appropriate for each culture and/or language region in which the application may be marketed would normally require that customized user interface code be manually written for each such version. However, the present invention enables the content sources that are appropriate for each localized version to automatically configure the user interface to include the appropriate control elements (including the correct language) and content for the culture and language of the users of the localized version in which the application will be marketed. Such automated modification of the user interface can save substantial costs and time in preparing each such version.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method for dynamically modifying a user interface of an application, in response to changes in content accessible through the user interface, comprising the steps of:
   (a) enumerating sources of content that are to be accessible through the user interface when the application is executed;
   (b) enumerating content processors associated with categories of different sources of content to obtain the data included in the different sources of content;
   (c) in response to data included in each different source of content that should be accessible through the user interface as a result of the changes in content, automatically changing the user interface to include any control elements needed to access the sources of content through the user interface without requiring manual intervention by a user to change the user interface;
   (d) building a control element hierarchy for the control elements within the user interface that will be displayed to the user of the application; and
   (e) displaying control elements within the user interface, in accord with the control element hierarchy, so that the control elements are provided in the user interface for accessing a content of each source of content currently available in the application.

2. The method of claim 1, wherein the step of modifying the user interface comprises the step of enumerating the control elements that are required in the user interface for accessing the content of each source of content that is enumerated.

3. The method of claim 1, wherein the step of building the control element hierarchy comprises the step of determining an order in which the control elements are displayed within the user interface.

4. The method of claim 1, wherein the step of building the control element hierarchy comprises the step of determining any sub-level control elements that will be displayed when a higher level element is selected by a user in the user interface.

5. The method of claim 1, further comprising the step of associating a different content processor with each different category of content, so that a content processor for a specific category determines the control elements needed to access each source of content provided within said specific category.

6. The method of claim 5, wherein each content processor is stored in a specific location, wherein enumerating the content processors includes enumerating the content processors found in the specific locations.

7. The method of claim 5, wherein each content processor is included in at least one file, further comprising the step of identifying the content processors based upon a specific file extension used in file names for the content processors.

8. The method of claim 7, said step of enumerating comprising the step of confirming that each file having the specific file extension comprises a true content processor for the application.

9. A memory medium storing machine instructions for carrying out the steps of claim 1.

10. A system for dynamically modifying a user interface of an application, in response to changes in content accessible through the user interface, comprising:
   (a) a memory in which a plurality of machine instructions are stored, including machine instructions for the application;
   (b) a display on which text and graphics are displayed to a user; and
   (c) a processor coupled to the memory and to the display, said processor executing the machine instructions to carry out a plurality of functions, including:
     (i) enumerating sources of content that are to be accessible through the user interface when the application is executed;
     (ii) enumerating content processors associated with categories of different sources of content to obtain the data included in the different sources of content;
     (iii) in response to data included in each different source of content that should be accessible through the user interface as a result of the changes in content, automatically changing the user interface to include any control elements needed to access the sources of content through the user interface without requiring manual intervention by the user to change the user interface;

(iv) building a control element hierarchy for the control elements for the sources of content within the user interface that will be displayed on the display to the user of the application; and (v) displaying the control elements within the user interface, in accord with the control element hierarchy, so that the control elements are provided in the user interface for accessing a content of each source of content currently available in the application.

11. The system of claim 10, wherein the machine instructions further cause the processor to enumerate the control elements that are required in the user interface for accessing the content of each source of content that is enumerated.

12. The system of claim 10, wherein the machine instructions further cause the processor to determine an order in which the control elements are displayed on the display within the user interface.

13. The system of claim 10, wherein the machine instructions further cause the processor to determine any sub-level control elements that will be displayed on the display within the user interface, when a higher level element is selected by a user in the user interface.

14. The system of claim 10, wherein the machine instructions further cause the processor to associate a different content processor with each different category of content, so that a content processor for a specific category determines the control elements needed to access each source of content provided within said specific category.

15. The system of claim 14, further comprising a storage, wherein each content processor is stored in a specific location within the storage, and wherein enumerating the content processors includes enumerating each content processor found in each content processor's specific location.

16. The system of claim 14, wherein each content processor is included in at least one file, and wherein the machine instructions further cause the processor to identify each content processor based upon a specific file extension used in file names for the content processors.

17. The system of claim 16, wherein the machine instructions further cause the processor to confirm that each file having the specific file extension comprises a true content processor for the application.

18. A method for localizing different content for different versions of an application, without requiring that a different user interface be employed to access the content provided for each different version of the application, comprising the steps of:

(a) enumerating all sources of content that are accessible by a version of the application when said version of the application is run;

(b) enumerating content processors associated with categories of different sources of content to obtain the data included in the different sources of content;

(c) in response to data included in each different source of content that should be accessible through the user interface as a result of changes in content, automatically changing the user interface to include any control elements needed to access the sources of content through the user interface without requiring manual intervention by a user to change the user interface;

(d) building a control element hierarchy for control elements within the user interface that will be displayed to the user of the version of the application; and (e) displaying the control elements within the user interface, in accord with the control element hierarchy, so that the control elements are provided in the user interface for accessing the content accessible by the version of the application.

19. The method of claim 18, wherein the step of modifying the user interface comprises the step of enumerating the control elements that are required in the user interface for accessing the content of each source of content that is enumerated for the version of the application that is run.

20. The method of claim 18, wherein the step of building the control element hierarchy comprises the step of determining an order in which the control elements are displayed within the user interface.

21. The method of claim 18, wherein the step of building the control element hierarchy comprises the step of determining any sub-level control elements that will be displayed when a higher level element is selected by a user in the user interface.

22. The method of claim 18, wherein a plurality of different categories of content are accessible to the version of the application, further comprising the step of associating a different content processor with each different category of content, so that for sources of content in a specific category, a content processor for said specific category determines the control elements needed to access each source of content provided within said specific category.

23. A memory medium storing machine instructions for carrying out the steps of claim 18.

24. A system for localizing different content for different versions of an application, without requiring that a different user interface employed to access the content be provided for each different version of the application, comprising:

(a) a memory in which a plurality of machine instructions are stored, including machine instructions for the version of the application;

(b) a display on which text and graphics are displayed to a user; and (c) a processor coupled to the memory and to the display, said processor executing the machine instructions to carry out a plurality of functions, including:

(i) enumerating all sources of content that are accessible by the version of the application when the version of the application is run by the processor;

(ii) enumerating content processors associated with categories of different sources of content to obtain the data included in the different sources of content;

(iii) in response to data included in each different source of content that should be accessible through the user interface as a result of changes in content, automatically changing the user interface to include any control elements needed to access the sources of content through the user interface without requiring manual intervention by a user to change the user interface;

(iv) building a control element hierarchy for control elements within the user interface that will be displayed to the user of the version of the application; and (v) displaying the control elements within the user interface, in accord with the control element hierarchy, so that the control elements are provided in the user interface for accessing the content accessible by the version of the application, and so that the user interface is modified as needed in response to the sources of content that are enumerated.

25. A method for dynamically changing a user interface in response to changes in content accessed through the user interface, comprising the steps of:
   (a) determining different sources of content that are available to be accessed through the user interface;
   (b) enumerating content processors associated with categories of the different sources of content, to obtain the data included in the different sources of content;
   (c) in response to data included in each different source of content that should be accessible through the interface as a result of the changes in content, automatically changing the user interface to include any control elements needed to access the sources of content through the user interface without requiring manual intervention by a user to change the user interface;
   (d) displaying the user interface as thus changed; and
   (e) enabling a user to selectively access any of the different sources of content, by activating a corresponding control element included in the user interface.

26. The method of claim 25, further comprising the step of enumerating the control elements for the sources of content, so that the control elements are included in the user interface to enable the sources of content to be accessed.

27. The method of claim 25, further comprising the step of determining a disposition of the control elements within the user interface when the user interface is displayed, based upon criteria included in the data.

28. The method of claim 25, wherein the step of determining the different sources of content comprises the step of searching a specific storage location for instances of a predefined type of file.

29. The method of claim 25, further comprising the step of determining structures for control elements used to access the sources of content, based upon the data included in each source of content.

30. A system for dynamically changing a user interface in response to changes in content accessed through the user interface, comprising:
   (a) a memory in which a plurality of machine instructions are stored, including machine instructions for the application;
   (b) a display on which text and graphics are displayed to a user; and
   (c) a processor coupled to the memory and to the display, said processor executing the machine instructions to carry out a plurality of functions, including:
      (i) determining different sources of content that are available to be accessed through the user interface;
      (ii) enumerating content processors associated with categories of the different sources of content, to obtain the data included in the different sources of content;
      (iii) in response to data included in each different source of content that should be accessible through the interface as a result of the changes in content, automatically changing the user interface to include any control elements needed to access the sources of content through the user interface without requiring manual intervention by a user to change the user interface;
      (iv) displaying the user interface as thus changed, on the display; and
      (v) enabling a user to selectively access any of the different sources of content, by activating a corresponding control element included in the user interface.

* * * * *